United States Patent Office 2,946,724

Patented July 26, 1960

1

2,946,724

STABLE POLIOMYELITIS LIVE VIRUS VACCINE

William Valentine, Nanuet, N.Y., assignor to American Cyanamid Company, New York, N.Y., a corporation of Maine No Drawing. Filed May 29, 1957, Ser. No. 662,333

4 Claims. (Cl. 167—78)

This invention relates to a free-flowing granular vaccine comprising non-pathogenic poliomyelitis virus and gelatin. More particularly, it relates to said vaccine in a form administrable by the oral route.

Poliomyelitis virus has been adapted to grow and made non-pathogenic through the use of various known media such as chick embryo, rodent brain, rodent spinal cord, tissue culture, etc. Generally, it can be said that the activity of the virus is stable under freezing conditions in the presence of moisture and that activity stability decreases as the temperature is increased. At about 40° C., for example, the poliomyelitis virus usually dies in about 3 days. At ordinary refrigerating temperatures (4° C.), the activity of the virus is less stable than under freezing conditions. Moreover, although stable when frozen, the poliomyelitis virus is essentially inactivated during a freeze-drying process.

There are several possible administrative routes which may be followed when inducing immunity to poliomyelitis. The most logical and the most desirable route to follow is the natural portal of entry, i.e., the oral route, employing an attenuated non-pathogenic living virus under quantitatively and qualitatively controlled conditions. Until the advent of the present invention, there had been many obstacles to be overcome before this ultimately desired result could be obtained. One of the many reasons why the oral route had not been successfully employed on a large scale basis heretofore can be found in the above brief discussion of the instability of the poliomyelitis virus.

In order to circumvent these difficulties, a number of proposals have been made prior to this invention; amongst others are a number of media for suspending the poliomyelitis virus. Polyethylene glycol was used to suspend the virus and this combination then filled into gelatin capsules. It was found, however, that this suspension medium was not a suitable carrier, because the virus lost activity in this medium upon standing for about one month. An attempt was made to use glycerine, a well known pharmaceutical and biological stabilizing medium; this attempt was unsuccessful also because it liquefied the gelatin shell when an attempt was made to encapsulate this virus suspension.

Live poliomyelitis vaccines have been administered orally in the past by adding a suspension of the poliomyelitis virus to milk after thawing from the frozen state. It has also been practiced in the past to add quantities of the virus as a suspension in polyethylene glycol to capsules for oral administration. All of these methods required formulation immediately before administration because of the instability of the activity of the virus if allowed to stand in milk, polyethylene glycol, other media, or in the unfrozen state. Many other proposals have been made; however, none have been successful in producing a vaccine suitable for oral use whose activity was stable.

Moreover, it is most desirable to provide a carrier or

2 suspending medium in which the activity of the virus is stable and which is suitable for gelatin encapsulation, preferably a dry, free-flowing one. Until the advent of the present invention, such a carrier or medium had not been found and the problems of dispensing, distributing, storing, and administering a poliomyelitis virus vaccine had greatly hampered progress toward effecting immunization to the poliomyelitis virus.

It has now been found that a suspension of any of the known types of the poliomyelitis virus in their propagation media can be combined with non-hydrated gelatin to produce a hydrated, free-flowing, encapsulable, particulate, granular poliomyelitis virus vaccine, the virus activity of which remains stable over an extended period of time. Although hydrated, the vaccine of this invention is substantially dry in appearance as is evidenced by its granular free-flowing characteristics. This vaccine makes possible encapsulation of the poliomyelitis virus and storage of the encapsulated vaccine for an extended period of time without adversely affecting the activity-stability thereof. It is thus possible to produce an oral poliomyelitis vaccine in large quantities which need not be made up immediately at the time of administration. The virus activity of this encapsulated poliomyelitis vaccine is stable at both room temperature (i.e., about 20° C.) and at ordinary refrigeration temperature (i.e., about 4° C.) for periods of several months.

In formulating the vaccine of the present invention, a propagation medium containing an attenuated poliomyelitis virus is blended with the gelatin by agitation. During agitation, the gelatin becomes hydrated with the virus-containing propagation medium and the virus is absorbed by the gelatin. During hydration, the vaccine evolves from an initial thin paste to a vaccine consisting of discrete particles when hydration is complete. The vaccine thus produced is a free-flowing, granular one which contains throughout a substantially uniform distribution of the virus.

Any known virus-propagation media may be used for the purposes of this invention. Examples of these are chick embryo, rodent brain and spinal cord (e.g. those of the hamster, cotton rat, mouse, rat, etc.), tissue culture, etc. The virus is propagated in any of the known media in a non-pathogenic form, and the resulting suspension of the virus in water, along with the tissue, salts, antibiotics, anti-fungal agents, etc. contained therein, are collected and compounded with the gelatin as described above. The attenuated non-pathogenic poliomyelitis virus used in this invention may titer from $10^1$ to $10^9$ doses of virus per cc. In practice, it will generally titer between about $10^3$ and $10^8$. The titer of the preferred oral virus dose ranges between about $10^4$ and $10^6$. The poliomyelitis virus, after propagation in the tissue culture medium of the following examples (virus medium No. 1), usually titers about $10^5$ to $10^9$, the preferred titer for oral dosage being obtained by dilution. After propagation in the rodent brain and spinal cord medium of the following examples (virus medium No. 2), the poliomyelitis virus usually titers between about $10^3$ and $10^6$.

Gelatin with a particle size of between about 10 to 140 mesh (U.S. standard sieve size) may be used for the purposes of this invention. Gelatin having a particle size of from about 60 mesh to 100 mesh is preferred. Various anti-bacterial agents and anti-fungal agents may be added to the virus-containing medium prior to its formulation with gelatin. For example, it has been found preferable in the present invention to utilize glycerine, one of several hexahydric alcohols (e.g. sorbitol, dulcitol, mannitol, etc.), nystatin, B naphthol, mixtures of the methyl and propyl esters of parahydroxy benzoic acid (i.e. a mixture consisting of 1 to 5 parts by weight of the methyl ester to 1 part by weight of the propyl ester), and mixtures of any of these anti-fungal agents with the virus and its propagation media. For example, it is preferable to add nystatin or some equivalent agent to the medium utilized to propagate the virus prior to incubation; after incubation and prior to combining with the gelatin, glycerine or some equivalent agent is added. Examples of anti-bacterial agents which have been used are penicillin, tetracycline, chlortetracyline, streptomycin, etc. These antibacterial and anti-fungal agents are absorbed along with the water, virus, etc. contained in the virus-containing media during hydration of the gelatin. The resulting free-flowing granular vaccine may be encapsulated in either soft shell gelatin capsules or hard shell gelatin capsules utilizing conventional apparatus and procedures. Various known excipients may be added prior to encapsulation to further enhance the free-flowing characteristic of the vaccine of the present invention. For example, starches such as potato starch, milo starch and corn starch have been utilized with the present invention in order to better facilitate encapsulation in soft shell capsules.

In general, the respective amounts of gelatin and virus suspension may vary over a wide range; for example, it has been found possible to successfully formulate the vaccine of the present invention by utilizing 10 parts by weight of gelatin to 1 part by volume of the virus suspension (25% to 75% by volume glycerine, preferably about 50%). At the other extreme, it has been found possible to formulate the vaccine of this invention successfully with 1 part by weight of gelatin to 4 parts by volume of the virus suspension. If the amount of gelatin is increased substantially beyond the 10:1 ratio described above, non-uniform distribution of the virus on the gelatin particles results, as there is insufficient liquid to initially completely wet down the surfaces of all of the gelatin particles. At the other extreme, if the amount of gelatin is decreased beyond the 1:4 ratio described above, the composition becomes lumpy and wet and is thus handled with difficulty at best. The preferred range for all three types of poliomyelitis virus is from 1 to 2 parts by weight of gelatin to 3 parts by weight of the virus suspension. If an excipient is added to this composition, it may be added in an amount in the range of from about 5% to 20% by weight of the excipient to the total weight of the gelatin and virus suspension; it has been found preferable to operate in a range from about 10% to 12% by weight.

There are several essential features of the new preparative method of this invention. First of all, in order to better facilitate encapsulation, the particle size of the gelatin starting material should fall within the range of about 10 to 140 mesh (U.S. standard sieve size). For best results, a gelatin particle size of from about 60 to 100 mesh is preferred. Secondly, the temperature of all ingredients must be controlled within a fairly narrow range of from about −5° C. to about 20° C., and working conditions dictate a temperature from about 3° C. to about 5° C. for optimum results. Finally, it is preferable that the gelatin be added in small quantities with agitation to the virus-containing medium (i.e. by sponging). It is possible to add the medium to the gelatin. However, if so performed, it is necessary to exercise caution by slow addition and rapid agitation in order to avoid extremely rapid hydration which results in the production of large aggregates of gelatin which are incompletely hydrated.

If the above-described temperature limitations are not utilized, an unsatisfactory product is produced. If one exceeds the upper temperature limitation (20° C.), large, tacky, incompletely hydrated particles of gelatin result from too rapid hydration. At these higher temperatures, these large particles which are unsuitable for encapsulation will exceed, in terms of weight, the finer particles suitable for encapsulation. In fact, it is only when one uses temperatures of 10° C. and below that one can be assured of completely satisfactory results. Below the lower temperature limitation (−5° C.), virus-containing solids separate from the liquid phase. It is, therefore, preferable to operate above 0° C. If gelatin having a particle size outside the range of about 10 to 140 mesh is utilized, it is unsuitable for encapsulation after it has been hydrated.

The following examples are given to more particularly illustrate the specific details of the present invention. Equivalent procedures and quantities will occur to those skilled in the art (e.g. chick embryo may be used in propagating the non-pathogenic attenuated poliomyelitis virus useful for the present invention). The following examples are, therefore, not meant to define the limits of the present invention, these being defined only by the scope of the appended claims.

EXAMPLE 1

The following is a description of (1) a typical preparation of a tissue culture medium and its use in growing Type I (SM strain), Type II (TN strain), or Type III (Fox strain) poliomyelitis virus and (2) a typical preparation of mouse brain and spinal cord medium and its use in preparing attenuated poliomyelitis virus of the same types and strains as set forth in (1) above. These media will be referred to in the examples that follow as virus-containing medium No. 1 and virus-containing medium No. 2, respectively:

(1) *Virus-containing medium No. 1*

A. *Growth of monkey kidney cells* (see volume 2, Virology, August, 1956, pages 575 and 576).—Kidneys removed from Rhesus or Cynomolgus monkeys are chopped into small particles and digested overnight (about 15 hours) at 4° C. with 0.25% solution of trypsin and viable cells are recovered therefrom. Approximately 150,000 of these cells per cc. are suspended in a tissue culture medium consisting of:

| | |
|---|---|
| Bovine serum ultra filtrate | 15 volumes. |
| Hank balanced salt solution | 80 volumes. |
| Beef embryo extract | 5 volumes. |
| Penicillin | 50 units per milliliter of fluid. |
| Streptomycin | 50 micrograms per milliliter of fluid. |

Hank balanced salt solution:

| | | |
|---|---|---|
| NaCl | 8.0 g. | per 1000 ml. of water. |
| KCl | 0.4 g. | |
| $CaCl_2$ (anhydrous) | 0.2 g. | |
| $Mg.SO_4.7H_2O$ | 0.2 g. | |
| $Na_2HPO_4.2H_2O$ | 0.06 g. | |
| $KH_2PO_4$ | 0.06 g. | |
| Glucose | 1.00 g. | |
| $NaHCO_3$ | 0.35 g. | |

The resulting cell suspension is dispensed into one-liter Povitsky bottles and incubated at 37° C. At the end of six days, the cells have adhered to the glass containers and have grown to form a complete sheet of cells on the bottom of each container.

B. *Growth of the virus.*—At the end of the sixth day, the fluid content of the tissue culture medium is removed from each bottle and replaced with 500 milliliters of tissue culture Medium No. 199 (see "Reagents and Media for Tissue Culture and Virus Propagation," published by Difco). The contents of each bottle is then seeded with 5 milliliters of attenuated poliomyelitis virus (see volume 162 of the Journal of the American Medical Association, December 1, 1956, page 1281). The seeded medium and cells are then incubated at 37° C. When substantially all of the cells are destroyed (i.e., they no longer adhere to the glass), the fluid medium and the cellular debris are harvested. This usually takes place at the end of four days. After harvesting, the harvested virus-containing medium No. 1 is tested for potency by titration in tissue culture tubes. It may then be combined with gelatin to form a granular free-flowing vaccine described above. However, if preferred, it may at this time be frozen and stored until it is desired to compound it with gelatin.

(2) *Virus-containing medium No. 2*

Swiss Albino mice are each inoculated with 0.03 milliliter of attenuated virus by the intra-cerebral of intra-spinal route. When the mice become paralyzed, the brains and spinal cords of each are harvested. A 20% weight/volume suspension is then prepared of the harvested brains and cords in normal saline solution to which is added 50 micrograms of streptomycin per milliliter of fluid and 50 units of penicillin per milliliter of fluid. This is virus-containing medium No. 2, and like virus-containing medium No. 1 described above, it may then be compounded with gelatin or it may be frozen and stored until it is desired to use it.

EXAMPLE 2

A Type I (SM strain) poliomyelitis virus vaccine was formulated containing the following components:

Gelatin (60–80 mesh, U.S. standard sieve size) _____gms__ 50
Corn starch _____gms__ 13
Virus-containing medium No. 1 _____cc__ 37.5
Glycerine _____cc__ 37.5

Virus-containing medium No. 1 and the glycerine were combined to form a virus suspension. Both the suspension and the gelatin were then cooled separately in ethanol-Dry Ice baths before blending to about 4° C. The gelatin was then sponged with the virus suspension at about 4° C. with agitation to form individually hydrated particles. The corn starch was then blended into this composition with agitation.

The hydrated, free-flowing, particulate, granular vaccine thus produced was then encapsulated in hard shell gelatin capsules and their potencies evaluated. Representative results of such evaluations appear below:

TITER OF VACCINE ACTIVITY

| Temp. | Initial | Times in Days | | |
|---|---|---|---|---|
| | | 1 | 7 | 13 |
| 27° C. | $10^{-4.3}$ | | | $10^{-4.5}$ |
| +4° C. | $10^{-4.3}$ | $10^{-4.5}$ | $10^{-4.5}$ | $10^{-4.3}$ |
| −15° C. | $10^{-4.3}$ | | | $10^{-5.2}$ |

EXAMPLE 3

A Type I (SM strain) poliomyelitis virus vaccine was formulated following the procedure of Example 2 with the following quantities of materials:

Gelatin (60–80 mesh) _____ 23.8 gm., 35% w./w.
Corn starch _____ 6.8 gm., 10% w./w.
Virus suspension (virus-containing medium No. 2—50% v./v. and glycerine U.S.P.—50% v./v. __ 34 cc., 55% w./w.

All ingredients and utensils, except the corn starch, were chilled to 4° C. before blending. The gelatin was hydrated slowly with agitation at low temperatures as in Example 2. When hydration was complete, the corn starch was added with agitation in three successive portions. A free-flowing, particulate, granular vaccine of effective titer as in Example 2 was thereby obtained.

EXAMPLE 4

A Type II (TN strain) poliomyetlitis virus vaccine of effective titer and free-flowing, particulate, granular form was formulated following the procedure of Example 2 and utilizing the following materials:

Gelatin (60–80 mesh) _____ 14.05 gm., 15.6% w./w.
Corn starch _____ 14.05 gm., 15.6% w./w.
Virus suspension (virus - containing medium No. 2—50% v./v. and glycerine U.S.P.— 50% v./v.) _____ 56.3 cc., 68.8% w./w.

A hydration temperature of 4° C. was utilized and when hydration was complete corn starch was added in three successive portions with agitation.

EXAMPLE 5

A Type II (TN strain) poliomyelitis virus vaccine of effective titer and free-flowing, particulate, granular form was formulated following the procedure of Example 4 utilizing the following ingredients:

Gelatin (60–100 mesh) _____gm__ 70
Corn starch U.S.P. _____gm__ 20
Virus-containing medium No. 1 _____cc__ 50
Glycerine U.S.P. _____cc__ 50

At the completion of the cold sponging step (4° C.), the corn starch was blended until discrete particles were formed, i.e., all aggregates broken.

EXAMPLE 6

A Type III (Fox strain) poliomyelitis virus vaccine of effective titer was formulated following the procedure and utilizing the same ingredients (other than the virus itself), i.e. gelatin, starch, glycerine, and medium No. 1, in the same quantities as Example 2. A hydrated, free-flowing, particulate, granular vaccine was obtained which, when encapsulated in soft shell capsules, illustrated potencies by tissue culture titration similar to those found in Example 2.

EXAMPLE 7

A Type III (Fox strain) poliomyelitis virus vaccine of effective titer was formulated following the procedure and utilizing the same ingredients (other than the virus itself), i.e., gelatin, glycerine, starch, and medium No. 2, in the same quantities as Example 3. A hydrated, free-flowing, particulate, granular vaccine was obtained which was encapsulated in hard shell capsules. Upon tissue culture titration, this vaccine illustrated potencies similar to those found in Example 3.

I claim:

1. An orally administrable poliomyelitis virus vaccine comprising an aqueous attenuated non-pathogenic poliomyelitis virus suspension adsorbed by substantially non-hydrated gelatin particles from 10 to 140 mesh as water of hydration, the amount of gelatin being sufficient so that after hydration with the virus suspension, the particles are substantially dry, said virus vaccine being free-flowing, particulate, granular, and storage-stable with respect to its activity.

2. The vaccine of claim 1 further characterized in that it contains an anti-microorganism agent.

3. The vaccine of claim 1 further characterized in that it contains an excipient.

4. A process of preparing a stable, orally administrable free-flowing, particulate, granular poliomyelitis vaccine suitable for encapsulation which comprises mixing with agitation an aqueous suspension of an attenuated non-pathogenic poliomyelitis virus and substantially non-hydrated gelatin having a particle size within the range of from about 10 mesh to about 140 mesh, at a temperature from about −5° C. to about 20° C., the relative amounts of virus suspension and gelatin particles being such that the gelatin particles after hydration by the suspension are substantially dry.

(References on following page)

References Cited in the file of this patent

UNITED STATES PATENTS 2,166,074     Reichel     July 11, 1939

FOREIGN PATENTS 738,454     Great Britain     Oct. 12, 1955

OTHER REFERENCES

Sabin: J.A.M.A., vol. 162, No. 18, Dec. 29, 1956, pp. 1589–1596.

Salk: J.A.M.A., vol. 162, No. 16, Dec. 15, 1956, pp. 1451–1459.

Davenport: J. of Exp. Med., vol. 91, No. 1, Jan. 1, 1950, pp. 58–64.

Terzin: Proc. Soc. Exp. Biol. and Med., vol. 84, No. 1, 1953, pp. 215–218.

Drug Trade News: Jan. 31, 1955, vol. 30, No. 3, pp. 37, 55.

Mfg. Chemist, February 1956, vol. 27, No. 2, pp. 49–50.